(12) United States Patent
Ramprashad et al.

(10) Patent No.: US 12,028,486 B2
(45) Date of Patent: *Jul. 2, 2024

(54) REAL-TIME CONTACT CENTER SPEECH ANALYTICS, WITH CRITICAL CALL ALERTS, DEPLOYED ACROSS MULTIPLE SECURITY ZONES

(71) Applicant: MEDALLIA, INC., San Francisco, CA (US)

(72) Inventors: Wayne Ramprashad, Wayne, PA (US); David Garrod, Leadville, CO (US)

(73) Assignee: Medallia, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,148

(22) Filed: May 16, 2023

(65) Prior Publication Data

US 2023/0291835 A1    Sep. 14, 2023

Related U.S. Application Data

(63) Continuation of application No. 17/345,712, filed on Jun. 11, 2021, now Pat. No. 11,652,922, which is a continuation-in-part of application No. 16/845,873, filed on Apr. 10, 2020, now Pat. No. 11,039,013.

(51) Int. Cl.
*H04M 3/51* (2006.01)
*G10L 15/18* (2013.01)
*G10L 15/26* (2006.01)
*H04M 3/42* (2006.01)

(52) U.S. Cl.
CPC .......... *H04M 3/5175* (2013.01); *G10L 15/18* (2013.01); *G10L 15/26* (2013.01); *H04M 3/42008* (2013.01); *H04M 3/5183* (2013.01); *H04M 2201/40* (2013.01); *H04M 2201/42* (2013.01); *H04M 2203/558* (2013.01)

(58) Field of Classification Search
CPC ............. H04M 3/5175; H04M 3/5183; H04M 2201/40; H04M 3/42008; G10L 15/18; G10L 15/26
USPC .............. 379/88.01, 265.03, 265.06, 265.05, 379/265.11, 265.13, 266.1
See application file for complete search history.

(56) References Cited

U.S. PATENT DOCUMENTS 9,225,694 B1 *  12/2015  Reitzen ................. H04L 63/105
2021/0182440 A1 *  6/2021  Singh .................... G06F 21/6245

* cited by examiner

*Primary Examiner* — Thjuan K Addy

(57) ABSTRACT

The invention relates to systems/methods that enable real-time monitoring/processing of contact center communications to provide timely, actionable analytic insights and real-time critical call alerts, while simultaneously providing best-in-class protection of sensitive customer information.

20 Claims, 18 Drawing Sheets

(PROCESS VIEW OF FIG.1 EMBODIMENT)

(ALTERNATIVE PROCESS VIEW OF FIG. 1 EMBODIMENT)

(PROCESS VIEW OF FIG.2 EMBODIMENT)

(PROCESS VIEW OF FIG.2 EMBODIMENT)

☐ Personal Names / Numbers

☐ include gender

☐ domestic / foreign / unknown

☐ Ages

☐ by decades (20-29, 30-39, 40-49, etc.)

☐ child / young adult / middle age / elder

☐ Locations

☐ by state

☐ by city / metro

☐ by zip code

FIG. 8A

Organizations / Entities government / for-profit / non-profit line of business (healthcare, retail, etc.)

Health Conditions / Procedures / Treatments medical / dental / psychiatric cardio-vascular / infection / ortho / etc.

anxiety / depression / addiction / etc.

REAL-TIME CONTACT CENTER SPEECH ANALYTICS, WITH CRITICAL CALL ALERTS, DEPLOYED ACROSS MULTIPLE SECURITY ZONES

CROSS-REFERENCE TO RELATED APPLICATION

This application is a continuation application and claims the benefit and priority to the U.S. application Ser. No. 17/345,712, filed on Jun. 11, 2021, which is a continuation-in-part application and claims the benefit and priority to the U.S. application Ser. No. 16/845,873, filed Apr. 10, 2020, which is incorporated by reference herein in its entirety.

FIELD OF THE INVENTION

The embodiments generally relate to the fields of audio/speech data processing, particularly audio/speech analytics based on speech-to-text ("STT") conversion, and more particularly systems/methods to provide such audio/speech analytics, along with critical call alerts, in real time. Furthermore, the embodiments relate to improved processes/systems for managing, redacting/tokenizing, storing, and selectively distributing Personally Identifiable Information ("PII"), Nonpublic Personal Information ("NPI"), Personal Health Information ("PHI"), Sensitive Personal Information ("SPI"), Personal Credit Information ("PCI"), and the like (collectively referred to hereafter as "sensitive information") in connection with such audio/speech analytics processes and deployments.

BACKGROUND

The modern contact center operates in a fast-paced and ever-changing environment. Indeed, there is often no "center" at all, but rather a distributed network of telephony equipment that services a widely distributed network of agents, some of whom may work in remote sites (e.g., at home) and some whom may work from various countries around the globe. A business process outsourcing ("BPO") industry provides flexibility to expand and contract an enterprise's virtual contact center as business needs require. Such services are available from The Results Company, InContact, FiveNine, and many others.

This distributed "virtual" contact center infrastructure affords many advantages to an enterprise, such as the ability to scale for seasonal demand or to meet emergency needs (such as the current Covid-19 crisis) and the ability to provide off-hours service using agents from different geographic time zones. However, using outsourced agents who may have little experience with the enterprise also presents a significant risk to the quality of customer service that such agents provide. Thus, timely monitoring and reporting of customer-agent interactions is more important than ever. Preferably, such monitoring should include both analytics (to gauge overall customer sentiment, agent performance and to spot trends) and critical call spotting (to avoid customer churn, for example). Furthermore, for optimal results, such monitoring should be available in real time or near real time.

While real-time monitoring of a distributed contact center provides many advantages, it also presents challenges because of the myriad of contractual and legal restrictions on the storage, use, processing and/or dissemination of sensitive information.

SUMMARY

Accordingly, there is a presently existing need for improved systems/processes for providing real-time contact center monitoring, alerting and analytics, while ensuring appropriate treatment of sensitive customer information. Embodiments of the present invention are intended to address such need. In light of the above, embodiments relate to systems/methods that enable real-time monitoring/processing of contact center communications to provide timely, actionable analytic insights and real-time critical call alerts, while simultaneously providing best-in-class protection of sensitive customer information.

Accordingly, generally speaking, and without intending to be limiting, one aspect of the embodiments relates to systems/processes for telephonic contact center monitoring in which: (a) at least the following steps are performed within a first (less secure) security zone: (i) receiving, in real time, contact center telephony data indicative of multiple agent-caller communications; (ii) separating, in real time, the received telephony data into tagged utterances, each representing a single utterance spoken by either an agent or a caller; and (iii) using a privacy-filtering ASR engine to process each utterance, in real time, into a corresponding sanitized ASR transcription; and (b) at least the following steps are performed within a second (more secure) security zone: (i) receiving, in real time, the tagged utterances; (ii) updating, in real time, a database to include each tagged utterance; and (iii) receiving, in real time, a critical call alert.

In some embodiments, the second (higher) security zone permits access by fewer users than the first security zone. In some embodiments, access to the second (higher) security zone is restricted to individuals who have successfully passed a criminal background check, drug test, and credit check.

In some embodiments, the steps performed within the second (higher) security zone further include: (iv) investigating the critical call alert by retrieving from the database utterance(s) associated with the identified critical call. In some embodiments, the steps performed within the second security zone further include: (v) employing a speech browser to display/play sanitized ASR transcript(s) and corresponding (unsanitized) utterance(s) associated with the identified critical call.

In some embodiments, steps (a)(i)-(iii) are performed (in the lower security zone) without storing any contact center telephony data in non-volatile storage locations. In some embodiments, immediately following transcription of an utterance in step (a)(iii), all contact center telephony data that corresponds to the transcribed utterance is removed/whitewashed from any computer readable storage device(s) in the first security zone.

In some embodiments, the steps performed within the first (lower) security zone further include: (iv) updating, in real time, a database to include the sanitized ASR transcription.

In some embodiments, step (a)(iii) utilizes an ASR engine to transcribe each utterance and a post-ASR redaction engine redact each transcription in accordance with specified redaction criteria. In some embodiments, step (a)(iii) utilizes a privacy-by-design STT engine to transcribe only non-sensitive information in accordance with an associated privacy-by-design language model.

Some embodiments include an initial step of selecting class(es) of sensitive information to tokenize, including one or more of: (1) personal names or identifying numbers; (2) ages; (3) locations; (4) organizations or entities; and/or (5) health conditions, procedures or treatments. Some embodiments further include an initial step of selecting one or more of the selected class(es) (1)-(5) for stratified tokenization.

In some embodiments, the steps performed within the first (lower) security zone further include: (v) providing real time analytics, based on the sanitized ASR transcriptions.

And some embodiments include the step of using a ML/NLP classifier to identify critical calls, in real time, based on the sanitized ASR transcriptions.

Again, generally speaking, and without intending to be limiting, another aspect of the invention relates to systems/processes for telephonic contact center monitoring in which: (a) at least the following steps are performed within a first (higher) security zone: (i) receiving, in real time, contact center telephony data indicative of multiple agent-caller communications; (ii) separating, in real time, the received telephony data into tagged utterances, each representing a single utterance spoken by either an agent or a caller; (iii) updating, in real time, a database to include each tagged utterance; (iv) using a privacy-filtering ASR engine to process each utterance, in real time, into a corresponding sanitized ASR transcription; and (v) receiving, in real time, a critical call alert; and (b) at least the following step(s) are performed within a second (lower) security zone: (i) updating, in real time, a database to include each sanitized ASR transcription.

In some embodiments, the steps performed within the second (lower) security zone further include: (ii) providing real time analytics, based on the sanitized ASR transcriptions.

In some embodiments, step (a)(iv) utilizes an ASR engine to transcribe each utterance and a post-ASR redaction engine redact each transcription in accordance with specified redaction criteria. In some embodiments, step (a)(iv) utilizes a privacy-by-design STT engine to transcribe only non-sensitive information in accordance with an associated privacy-by-design language model.

Some embodiments include an initial step of selecting class(es) of sensitive information to tokenize, which may include one or more of: (1) personal names or identifying numbers; (2) ages; (3) locations; (4) organizations or entities; and (5) health conditions, procedures or treatments. In some embodiments, such initial step may further include selecting one or more of the selected class(es) for stratified tokenization.

Still further aspects of the embodiments relate to computer executable instructions, embodied in non-transitory media, for implementing parts or all of the systems and processes described herein.

BRIEF DESCRIPTION OF THE FIGURES

Aspects, features, and advantages of the present invention, and its exemplary embodiments, can be further appreciated with reference to the accompanying set of figures, in which:

FIGS. 8a-b show exemplary screen(s) suitable for selection of sensitive information classes to tokenize, and selection of stratification options within the selected classes, for use in connection with certain embodiments;

DESCRIPTION OF EMBODIMENT(S)

Figure 1:
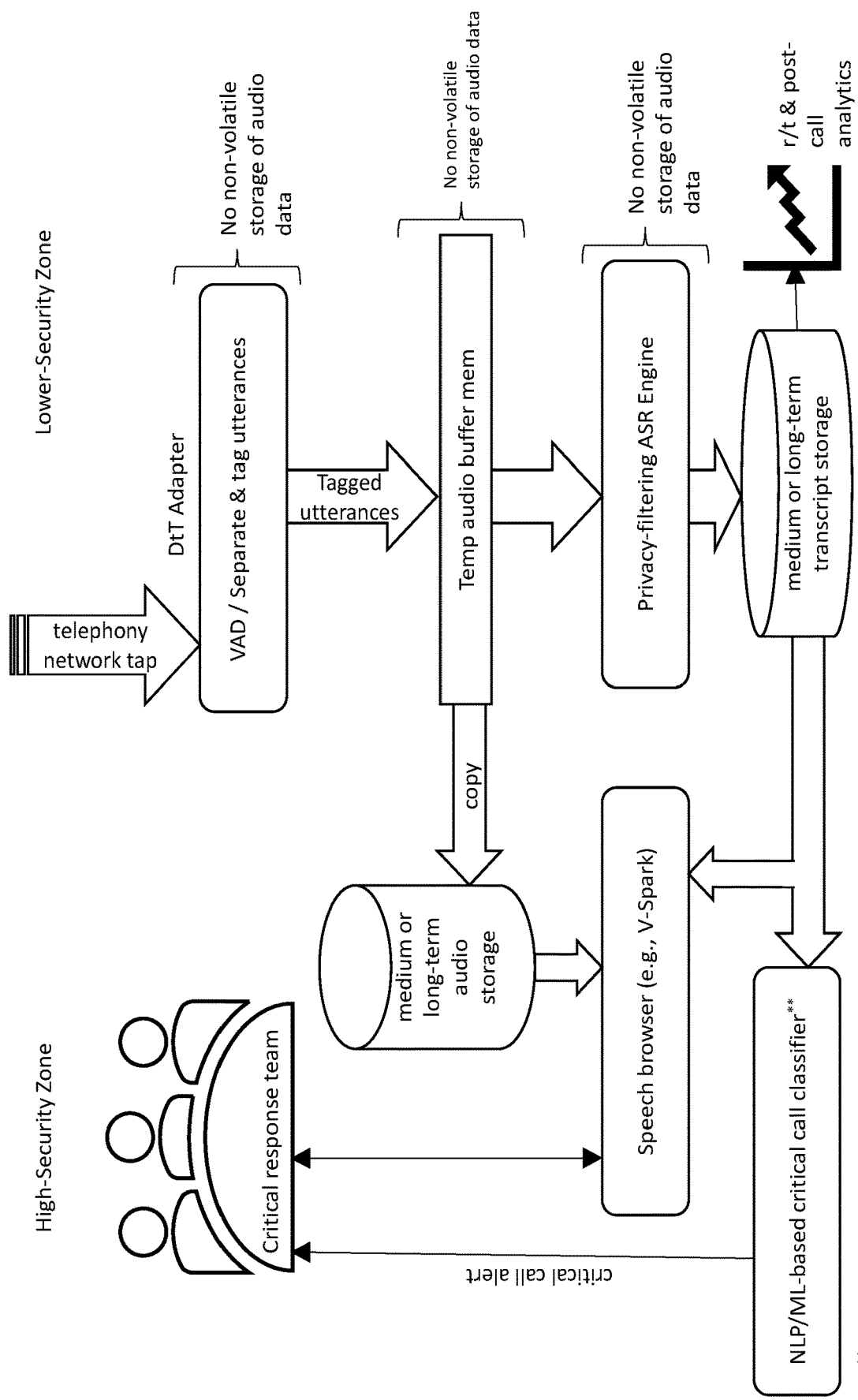
FIG. 1 depicts an exemplary deployment of real-time contact center speech analytics, with critical call alerts, according to some embodiments.

Reference is initially made to FIG. 1, which depicts an exemplary deployment of real-time contact center speech analytics, with critical call alerts, according to some embodiments. The diagram shows certain portions operating within a high security zone (left of the dashed line) and other components operating within a lower security zone (right of the dashed line).

In this embodiment, telephony data is captured within (or enters via) the lower security zone. Some methods for capturing or receiving real-time contact center telephony data are described in U.S. patent application Ser. No. 16/371,011, entitled "On-The-Fly Transcription/Redaction Of Voice-Over-IP Calls," filed Mar. 31, 2019 by inventors Koledin et al., which application is commonly owned by assignee Medallia, Inc., and is incorporated by reference herein in its entirety.

A direct-to-transcription ("DtT") adapter preferably performs voice activity detection ("VAD") and, upon detection of an active voice signal, segregates it into sequential utterances, tags each and stores them in a temporary audio buffer, pending ASR processing.

Voice activity detection is an optional step. Its main function is to eliminate dead space, to improve utilization efficiency of more compute-intensive resources, such as the ASR engine, or of storage resources. VAD algorithms are well known in the art. See https://en.wikipedia.org/wiki/Voice_activity_detection (incorporated by reference herein).

Segregation of the speech input into words or utterances (preferred) is performed as an initial step to ASR decoding. Though depicted as a distinct step, it may be performed as part of the VAD or ASR processes.

Because the DtT adapter and temporary audio buffer operate within the lower security zone, it may be desirable to avoid use of non-volatile storage media. It is also desirable that both perform a whitewash process on volatile storage locations used to store telephony or audio data once the need to maintain such data ends.

In some embodiment, privacy-filtering ASR processing is performed within the lower security zone. Hence, such processing may be performed without use of non-volatile storage media and with audio data whitewash upon completion. The privacy-filtering ASR engine produces sanitized transcriptions that can be used, processed and distributed within the lower security zone. One such use of these transcripts is to provide real-time and/or post-call analytics for unrestricted use and distribution within the enterprise. Because the privacy-filtered (sanitized) transcripts contain no sensitive information, it is acceptable to store them long-term within the lower security zone.

Focusing now on the high security zone, a critical call classifier—utilizing natural language processing ("NLP")/machine learning ("ML") techniques—is used to identify critical calls (e.g., customers likely to leave, angry customers, agent misbehavior, etc.) immediately upon their transcription. (In fact, such determination need not await complete transcription of the call, but may proceed in real time while the call is still in progress.) Because the critical call classifier makes its determination based upon the sanitized ASR transcripts, it can be alternatively located within the lower security zone.

Once a call is identified as critical, an immediate alert is sent to a critical response team that operates within the high security zone. Using a speech browser (such as assignee's Voci by Medallia V-Spark product), members of the critical response team can listen to the call's unfiltered (unredacted) audio utterances to verify criticality and plan appropriate corrective action.

Figure 2:
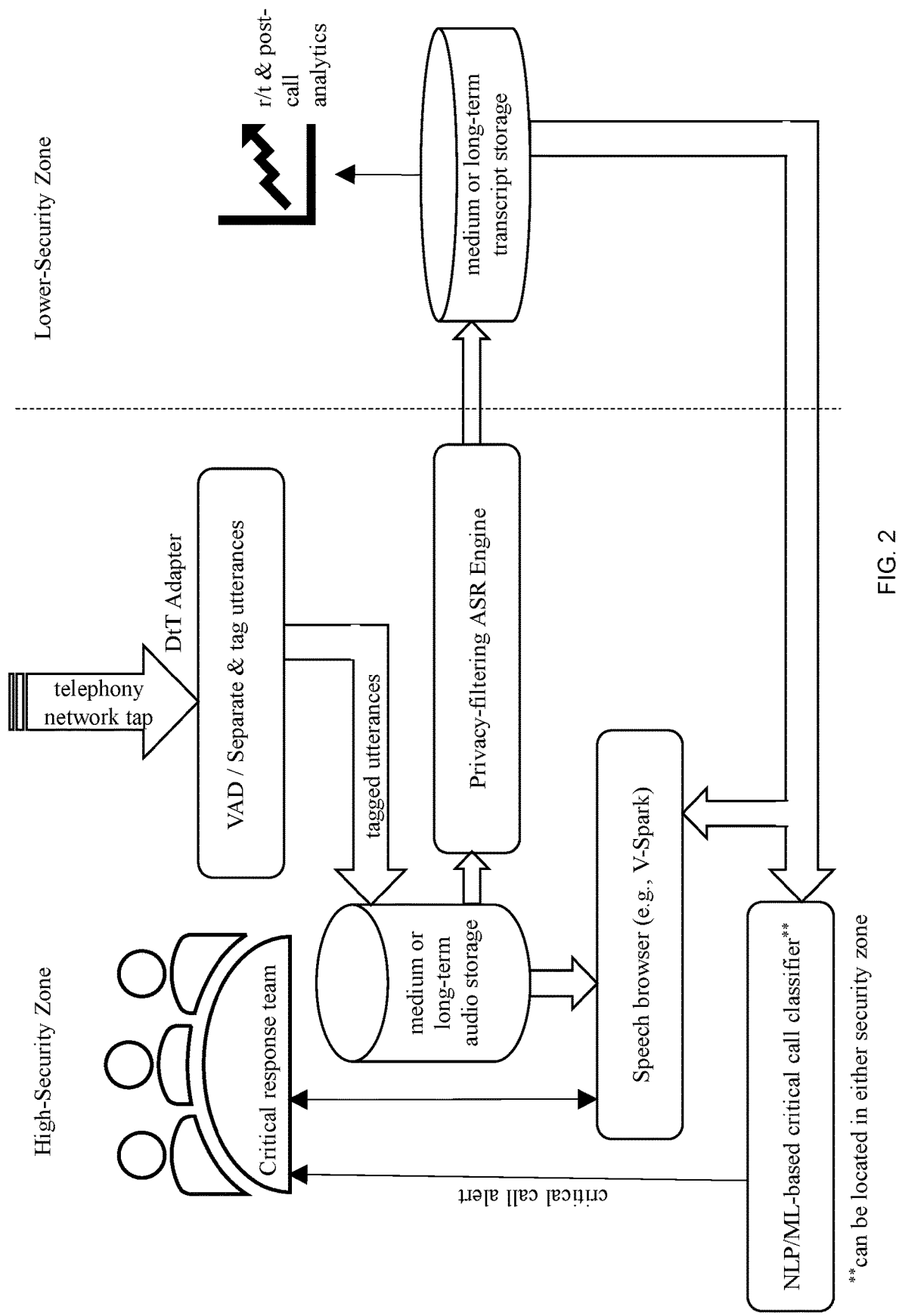
FIG. 2 depicts an exemplary deployment of real-time contact center speech analytics, with critical call alerts, according to some embodiments.

Reference is now made to FIG. 2, which depicts an exemplary deployment of real-time contact center speech analytics, with critical call alerts, according to some embodiments. This embodiment places more functional units within the high security zone (left of the dashed line) and fewer in the lower security zone (right of the line). Here, because they operate within the high security zone, the DtT adapter (with its VAD and utterance separation/tagging functions), tagged utterance buffer, and privacy-filtering ASR engine need not avoid use of non-volatile storage media or implement post-use whitewashing procedures.

Figure 2A:
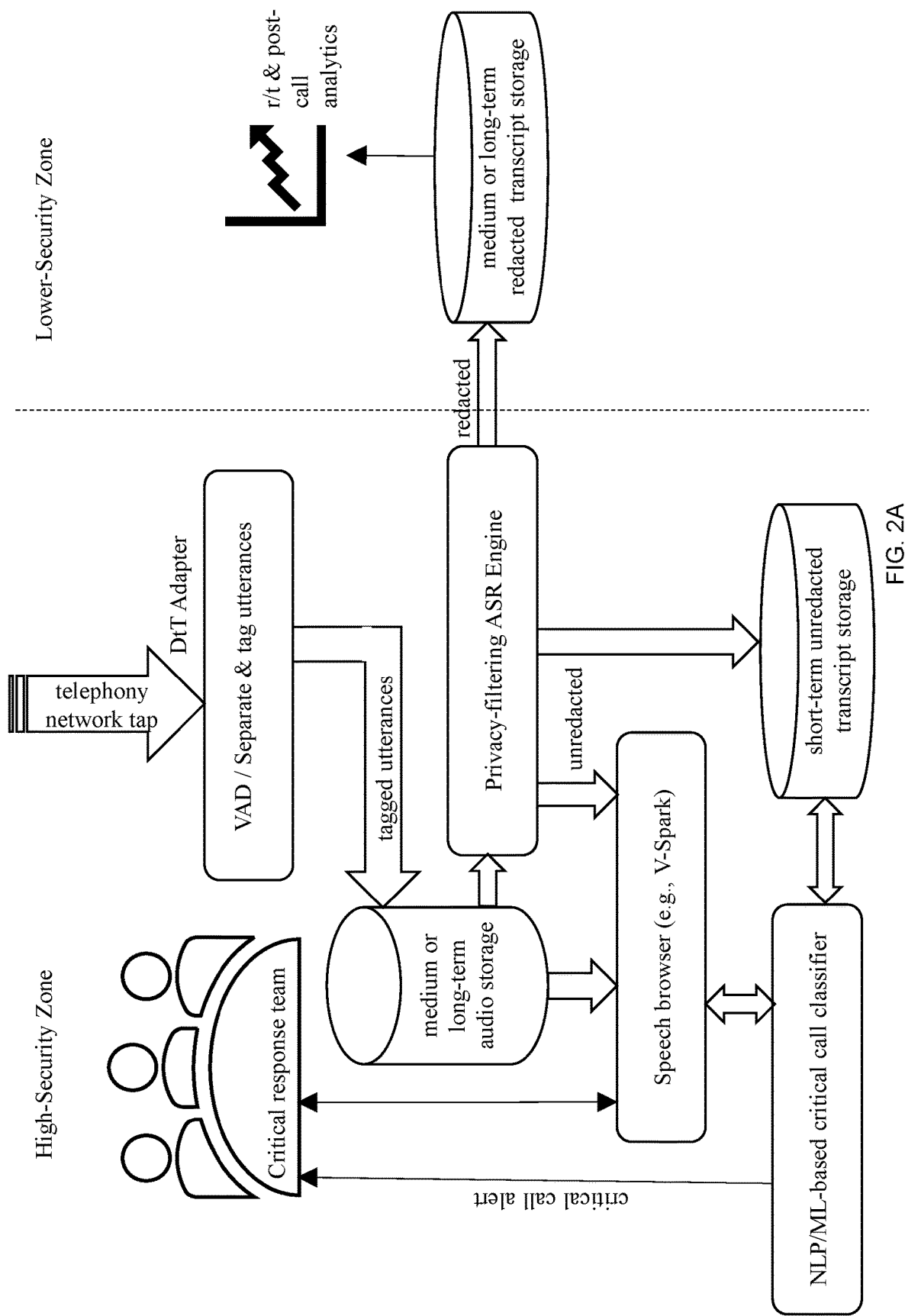
FIG. 2a shows a modified version of the FIG. 2 embodiment.

This embodiment shows the critical call classifier located in the high security zone; however, as before, it can alternatively be located in the lower security zone. Other details—critical call response, as well as real-time and post-call analytics—are the same in this embodiment as in the embodiment illustrated in FIG. 1. FIG. 2a shows a modified version of the FIG. 2 embodiment. In FIG. 2a, the privacy-filtering ASR engine is configured to output both unredacted and redacted text. The unredacted text is maintained within the higher security zone, where it can be fed to the critical call classifier, also located in the higher security zone. The purpose of this arrangement is to facilitate quicker and/or more accurate identification of critical calls, by reducing the informational "noise" or uncertainty that redaction can add. Additionally, in this embodiment, the critical response team has access to unredacted ASR text, via the speech browser.

Figure 3:
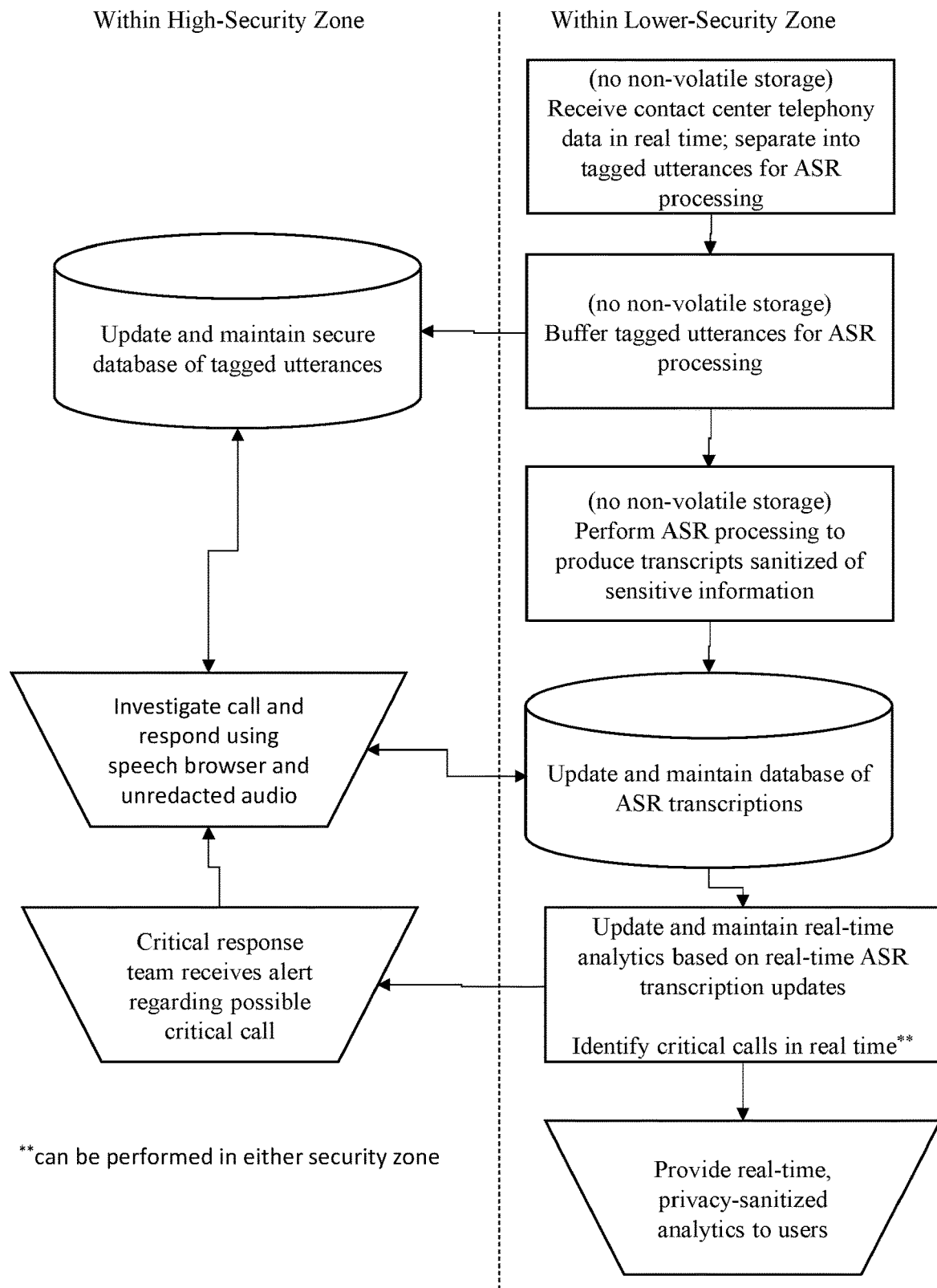
FIG. 3 shows a process view of real-time contact center speech analytics, with critical call alerts, using the FIG. 1 embodiment.

FIG. 3 shows a process view of the embodiment in FIG. 1.

Figure 3A:
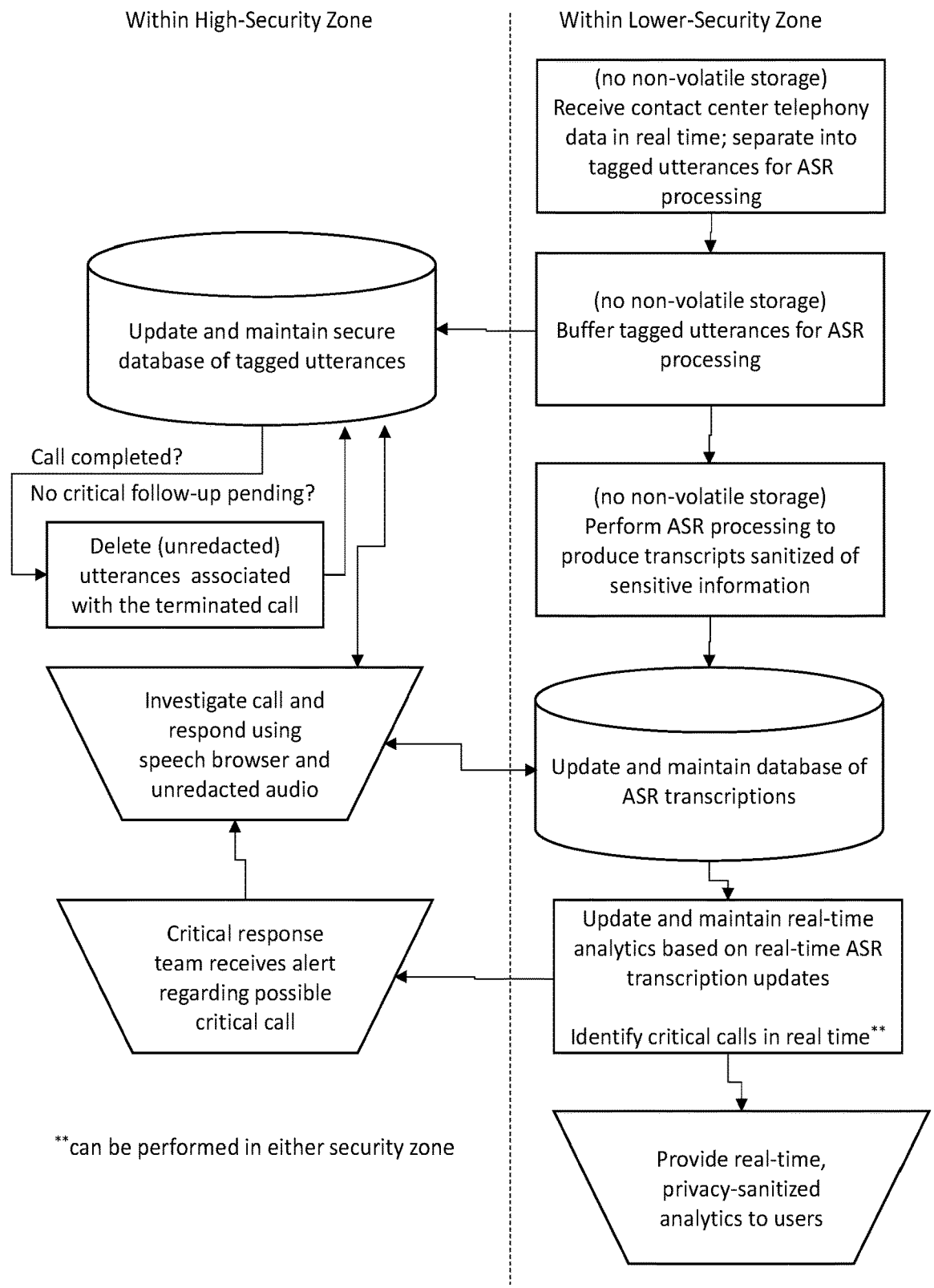
FIG. 3a shows a modification of the FIG. 3 process.

FIG. 3a shows an alternative process view of the embodiment shown in FIG. 1. This alternative process flow provides improved security by automatically deleting unredacted utterances immediately after the termination of the call in which they appear, assuming that no critical call follow-up action is pending.

Figure 4:
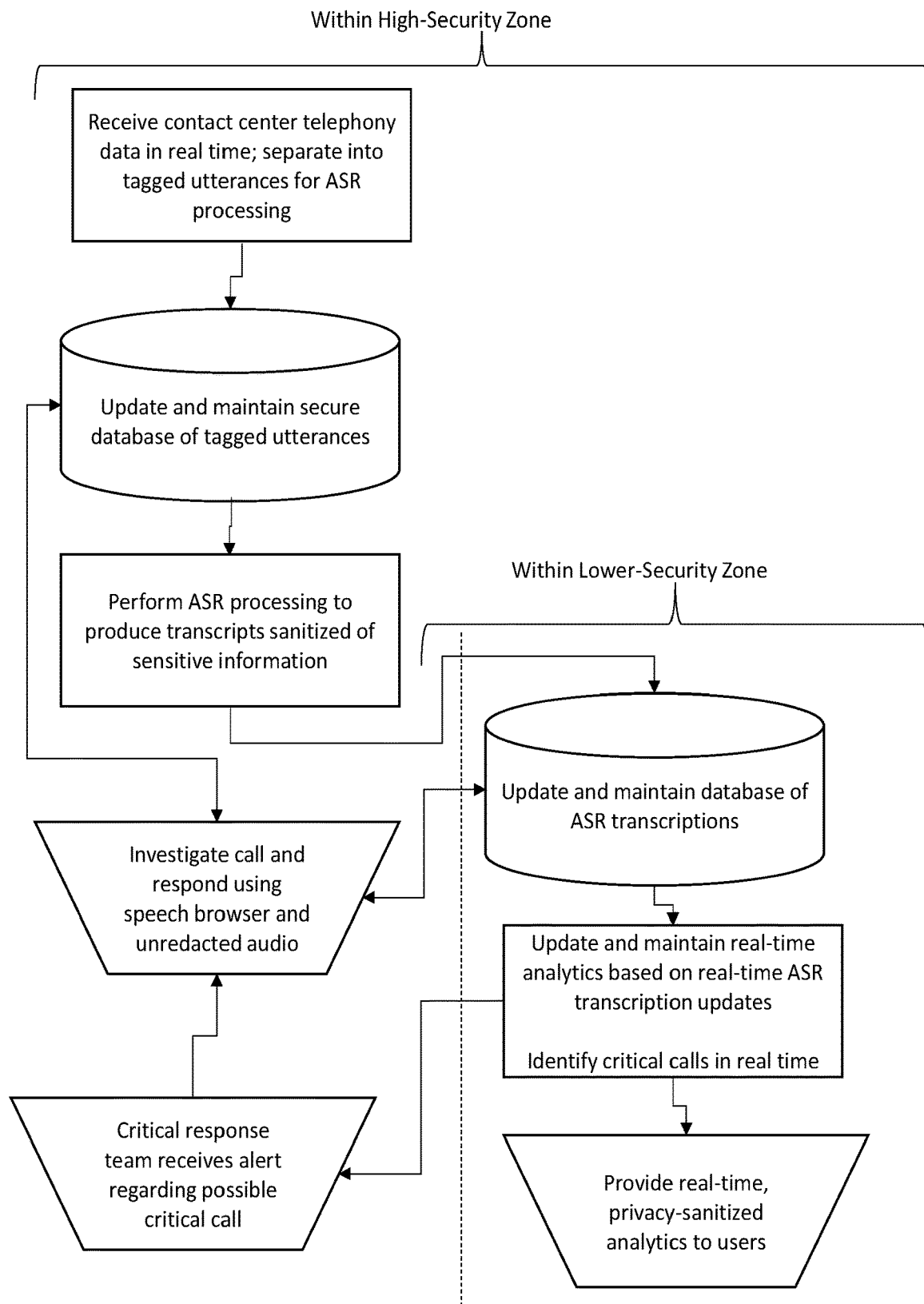
FIG. 4 shows a process view of real-time contact center speech analytics, with critical call alerts, using the FIG. 2 embodiment.

FIG. 4 shows a process view of this second embodiment.

Figure 4A:
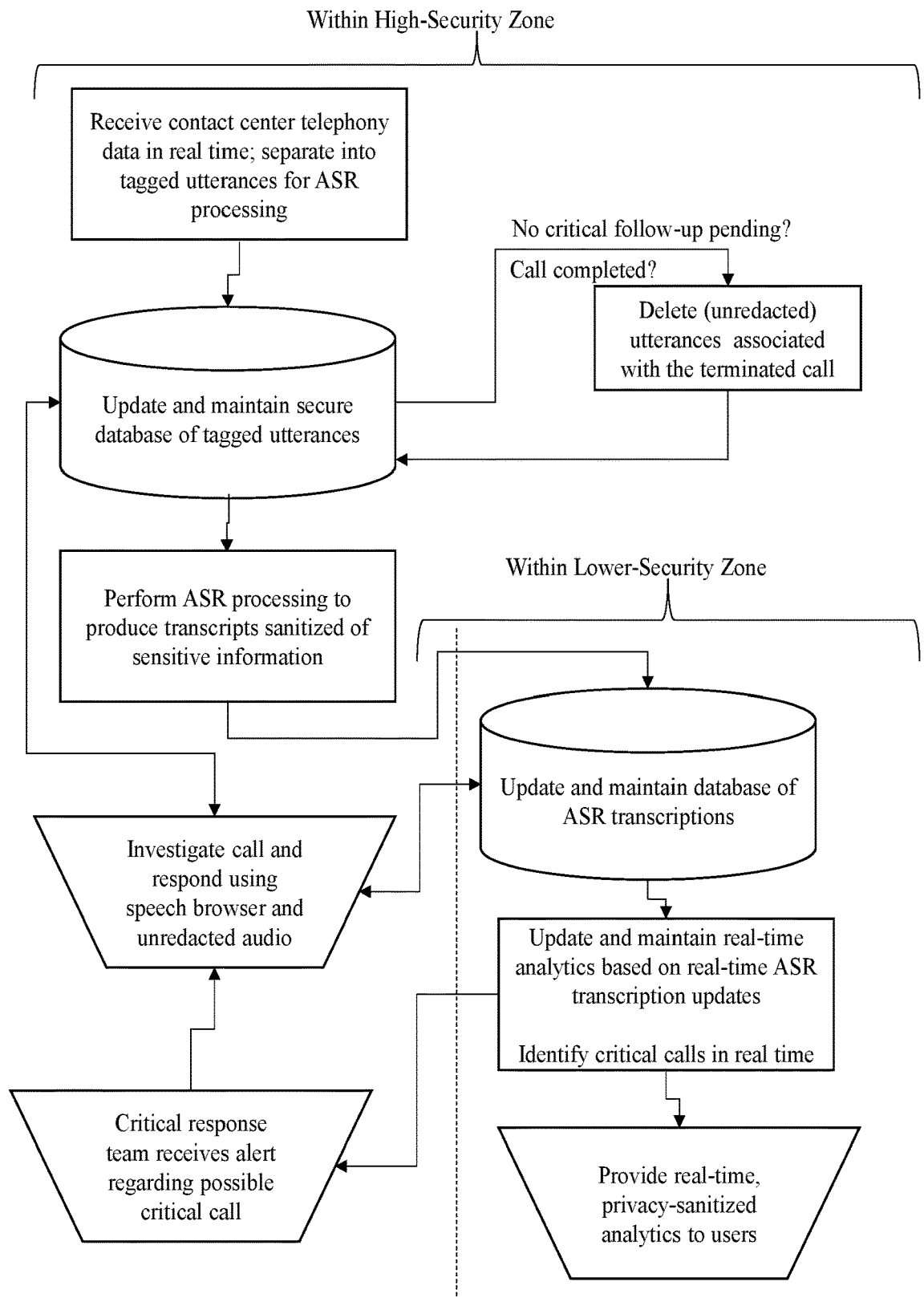
FIG. 4a shows a modification of the FIG. 4 process.

FIG. 4a shows an alternative process view of the embodiment shown in FIG. 1. Like FIG. 3a, this alternative process flow provides improved security by automatically deleting unredacted utterances immediately after the termination of the call in which they appear, assuming that no critical call follow-up action is pending.

Figure 5:
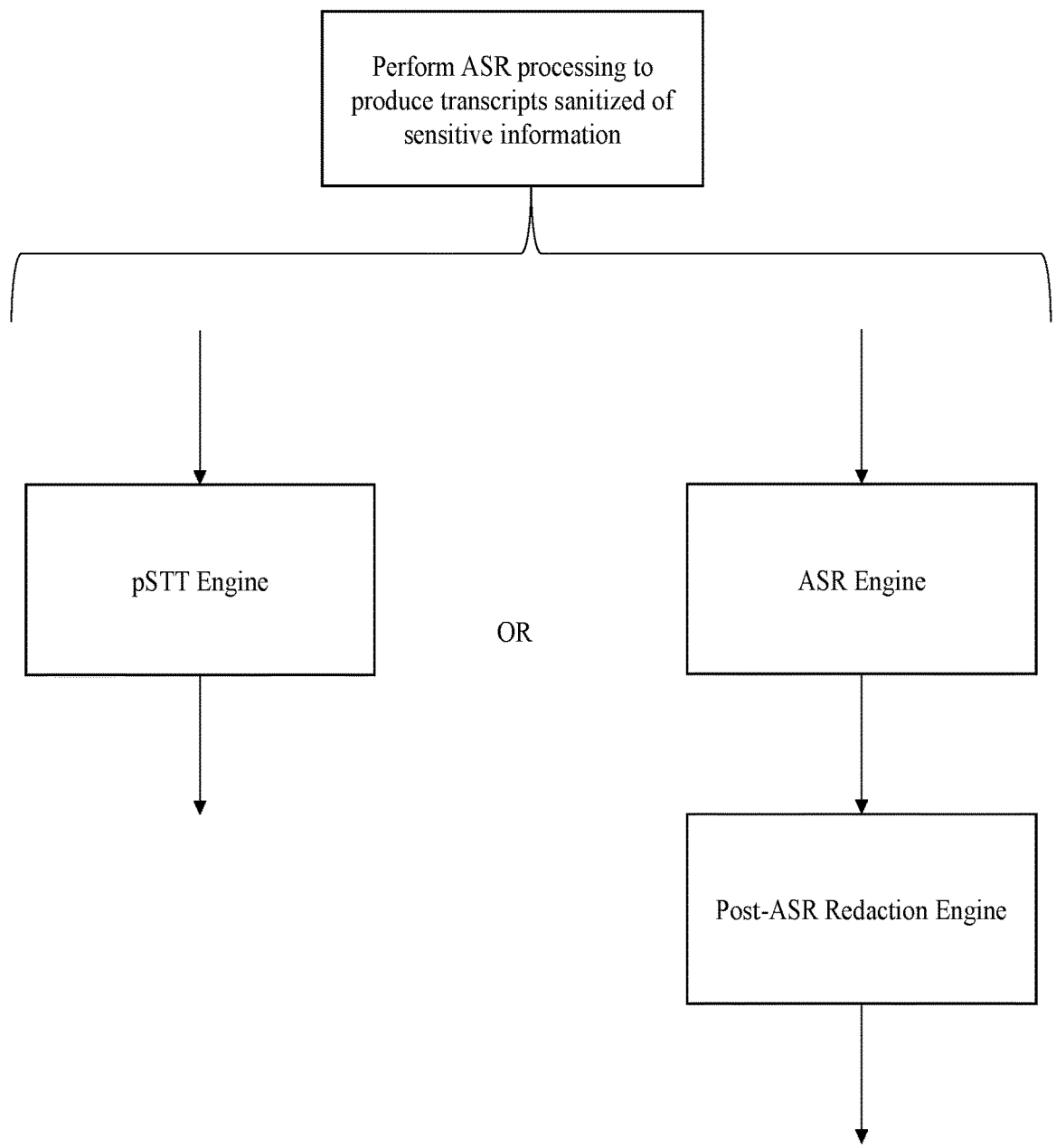
FIG. 5 depicts two alternative approaches to privacy-filtered ASR processing in accordance with some embodiments.

Reference is now made to FIG. 5, which depicts two alternative approaches to privacy-filtering ASR processing in accordance with some embodiments. As depicted, privacy-filtering ASR processing may employ either (i) a pSTT engine (the preferred approach) or (ii) an ordinary ASR engine with post-ASR redaction. In both cases, each of the components (pSTT engine, ASR engine, post-ASR redaction engine) may be located on premises, in a cloud, or across a combination of the two (for example, a configuration that uses the cloud only when on-premises capacity is exhausted).

Figure 6:
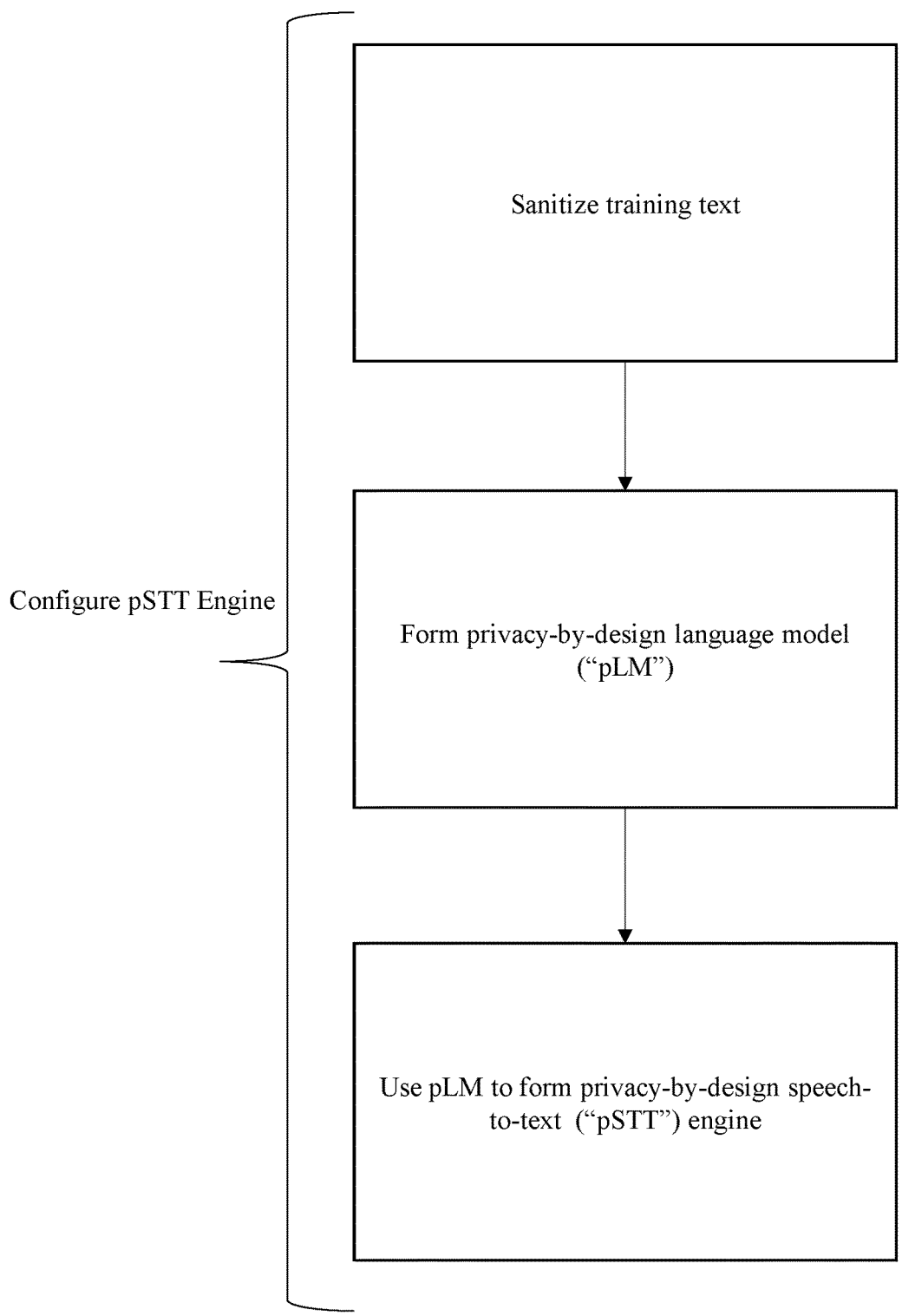
FIG. 6 depicts the basic steps involved in configuring a privacy-by-design speech-to-text ("pSTT") engine suitable for use in connection with some embodiments.

Reference is now made to FIG. 6, which depicts the basic steps involved in configuring a pSTT engine for use in connection with the present invention. A pSTT engine is an ASR engine that operates with a privacy-by-design language model ("pLM"). Because the pLM is trained on sanitized (tokenized) text, it automatically tokenizes sensitive information (hence achieving "privacy by design") as part of the recognition process. Details regarding the configuration and use of pSTT engines and pLM's are described in U.S. patent application Ser. No. 16/845,146, entitled "Privacy-by-Design Speech-to-Text Processing and Speech Analytics," filed Apr. 10, 2020 by inventors Garrod and Hines, which application is commonly owned by assignee Medallia, Inc., and is incorporated by reference herein in its entirety.

Figure 7:
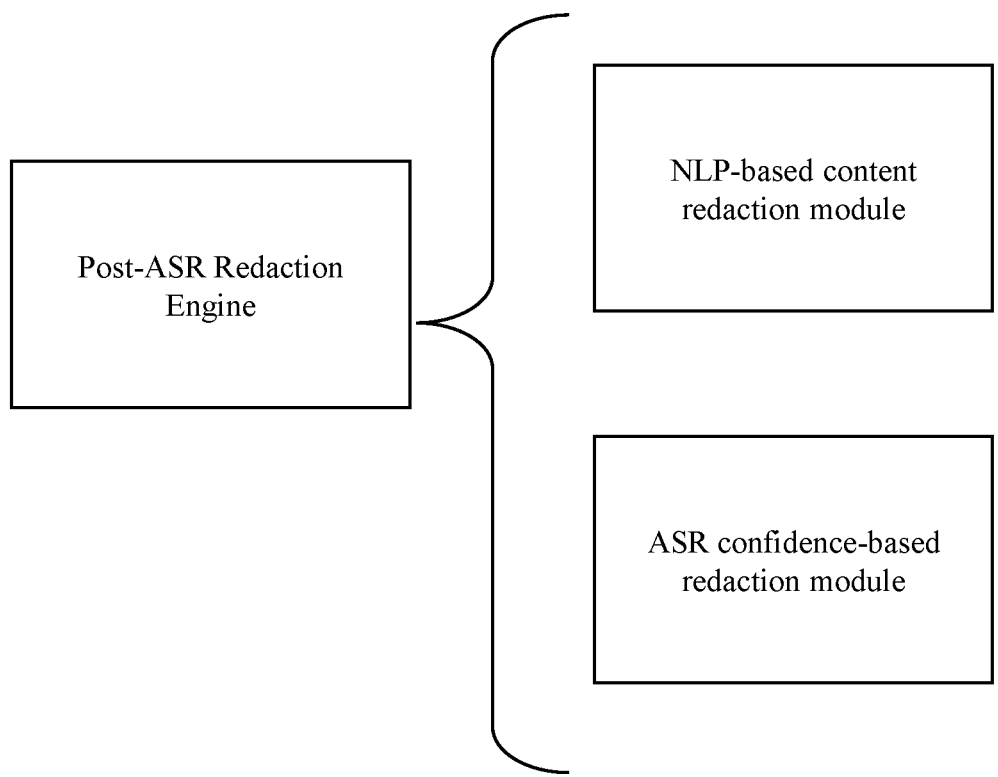
FIG. 7 depicts a preferred form of post-ASR redaction engine suitable for use in connection with some embodiments.

Reference is now made to FIG. 7, which depicts a preferred form of post-ASR redaction engine suitable for use in connection with some embodiments. Here, the post-ASR redaction engine may involve just a NLP-based content redaction module, or such in combination with a confidence-based redaction module. Both approaches are described in U.S. patent application Ser. No. 16/162,997, entitled "Use of ASR Confidence to Improve Reliability of Automatic Audio Redaction," filed Oct. 17, 2018 by inventors Garrod et al., which application is commonly owned by assignee Medallia, Inc., and is incorporated by reference herein in its entirety.

Figure 5A:
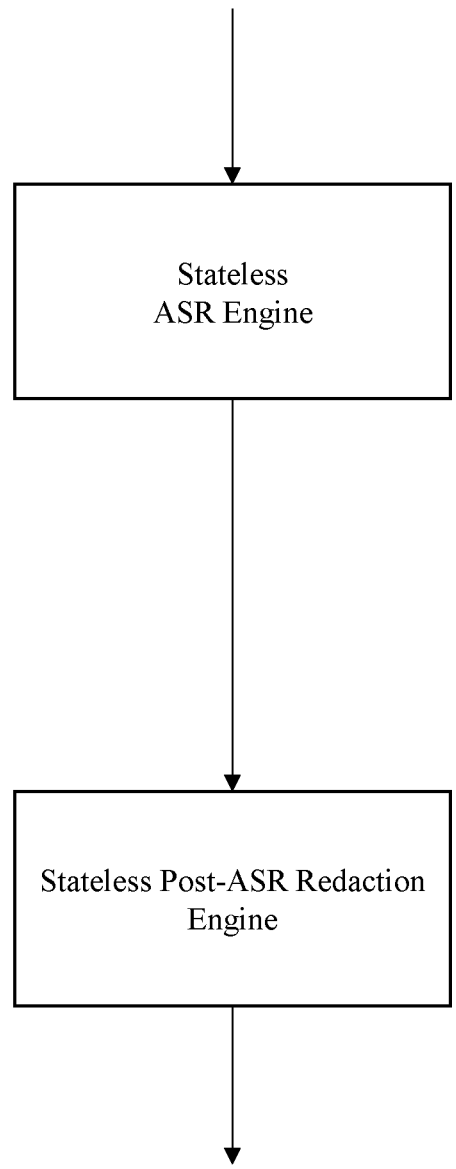
FIG. 5a depicts one example of the convert-then-redact approach to privacy-filtered ASR processing.

FIG. 5a depicts one example of this convert-then-redact approach to privacy-filtered ASR processing. Here, both the ASR engine and the redaction engine are stateless, meaning that they do not retain any record of utterance(s) previously processed. In certain respects, this approach is easier to implement, but it may lead to increased errors by omitting state, particularly in the post-ASR redaction process. For example, a phrase like "102 to 103" might represent a symptom (fever) and thus constitute PHI, or it might represent a basketball score, or it might even represent part of an address and thus constitute PII.

Figure 5B:
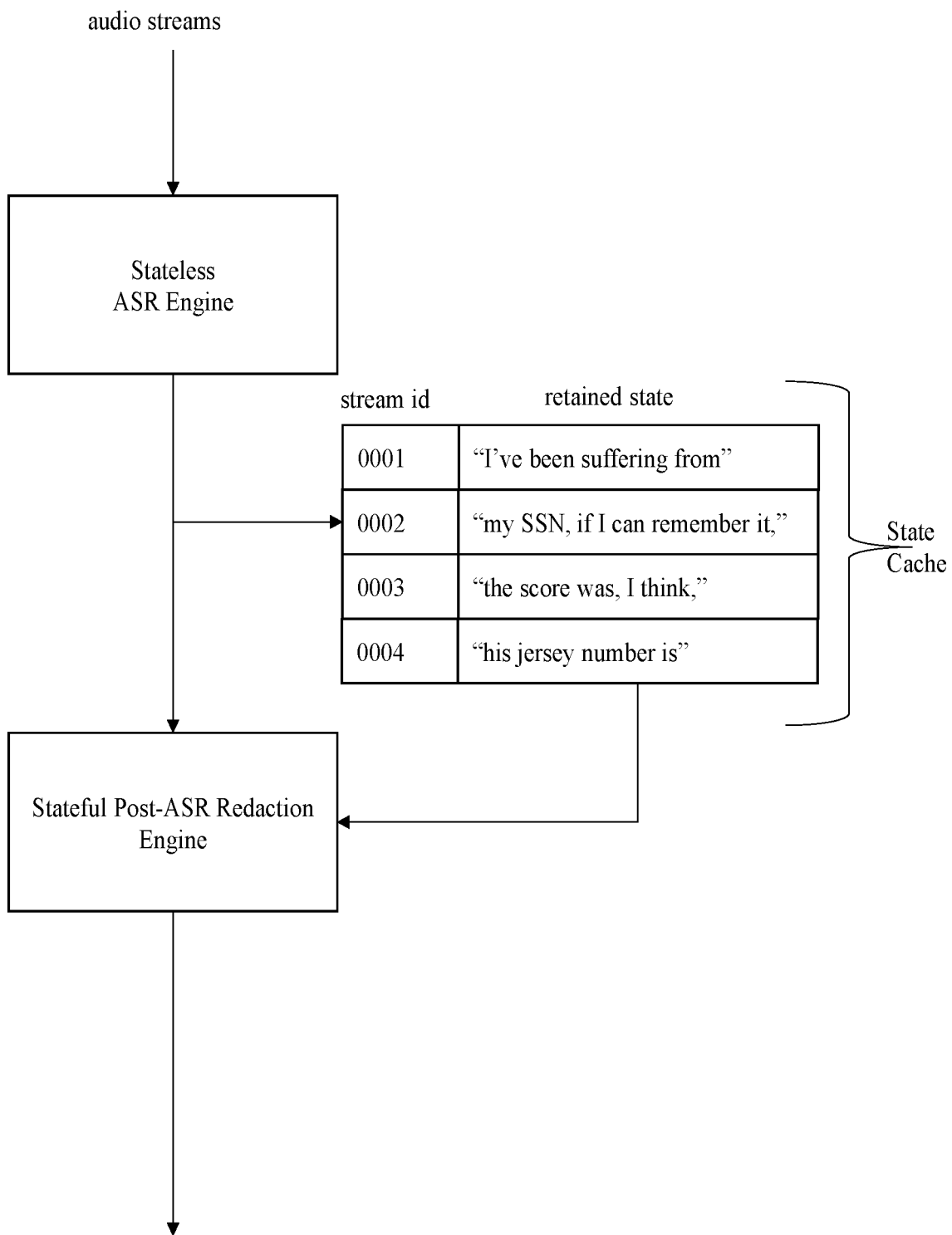
FIG. 5b depicts a second example of the convert-then-redact approach to privacy-filtered ASR processing.

FIG. 5b depicts a second example of the convert-then-redact approach to privacy-filtered ASR processing: Stateless ASR, followed by stateful redaction. Here, a state cache maintains selected "state" for each of the active streams. (Active streams could represent the not-yet-terminated calls, or simply a collection of stream IDs that the stateless ASR engine has seen recently, e.g., within the past five minutes, for example.) While the figure shows the maintained states as some portion—or all—of the previously transcribed utterance(s) for the streams-in-question, state might also be maintained through one or more status indicators, like HEALTH CONVERSATION or PCI LIKELY or PII LIKELY, either alone or in combination with the previously-transcribed utterance(s).

Figure 5C:
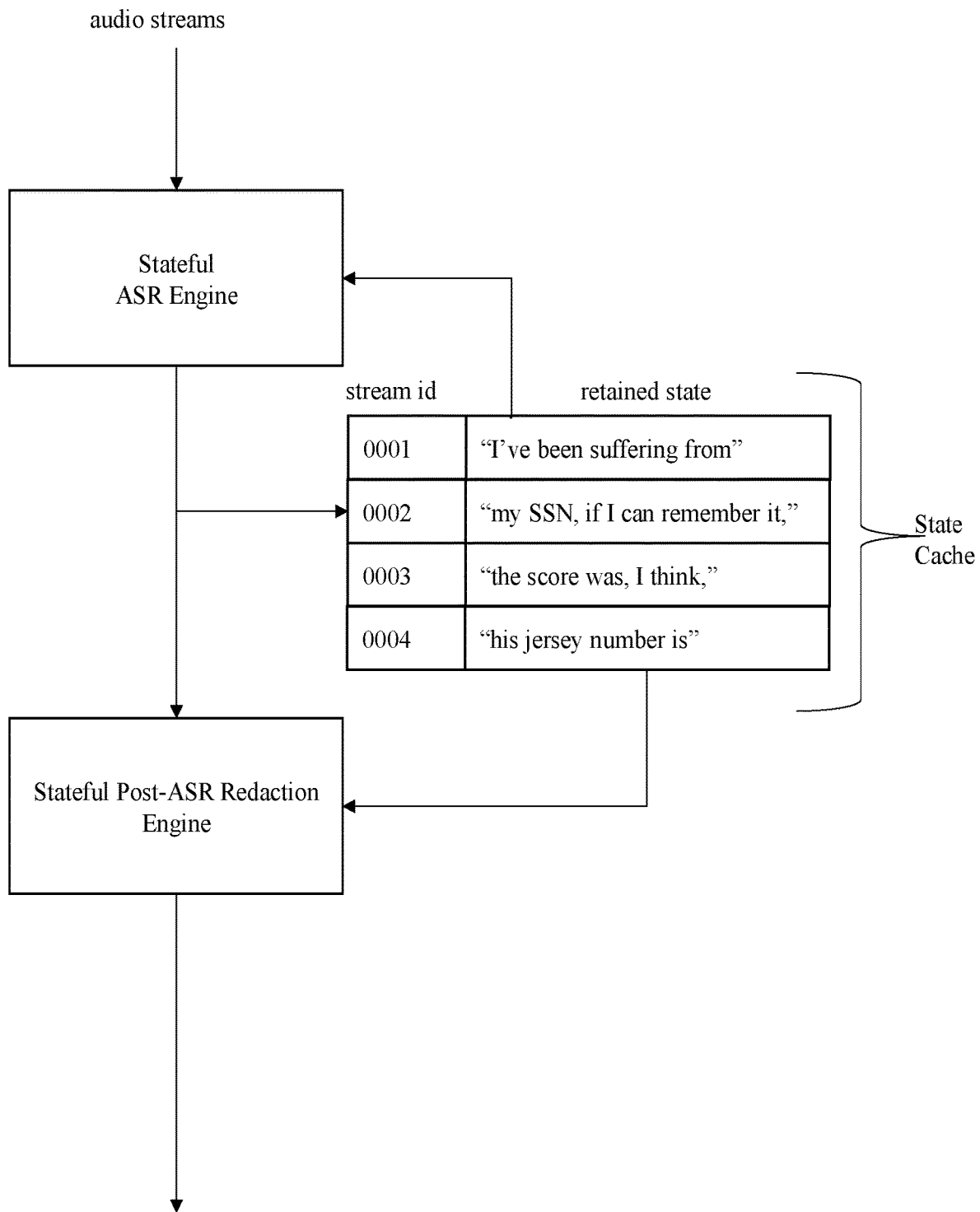
FIG. 5c depicts a third example of the convert-then-redact approach to privacy-filtered ASR processing.

FIG. 5c depicts a third example of the convert-then-redact approach to privacy-filtered ASR processing: Stateful ASR, followed by stateful redaction. In this example, the implementation is very similar to 5b, except that the retained state is also available for use by the ASR engine as well as the redaction engine.

Figure 8B:
Figure 8B:
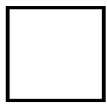
Figure 8B:
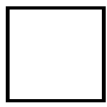
Figure 8B:
Figure 8B:
Figure 8B:
Figure 8B:
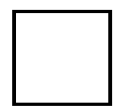

Reference is now made to FIGS. 8a-b, which show exemplary screen(s) suitable for selection of sensitive information classes to tokenize, and selection of stratification options within the selected classes, for use in connection with certain embodiments. Certain methods for selection of sensitive information classes to tokenize, stratification within the selected classes, and privacy-preserving analytics based on same are described in U.S. patent application Ser. No. 16/836,315, entitled "Privacy-by-Design Speech-to-Text Processing and Speech Analytics," filed Mar. 31, 2020 by inventor Garrod, which application is commonly owned by assignee Medallia, Inc., and previously incorporated by reference herein by its entirety.

Figure 9:
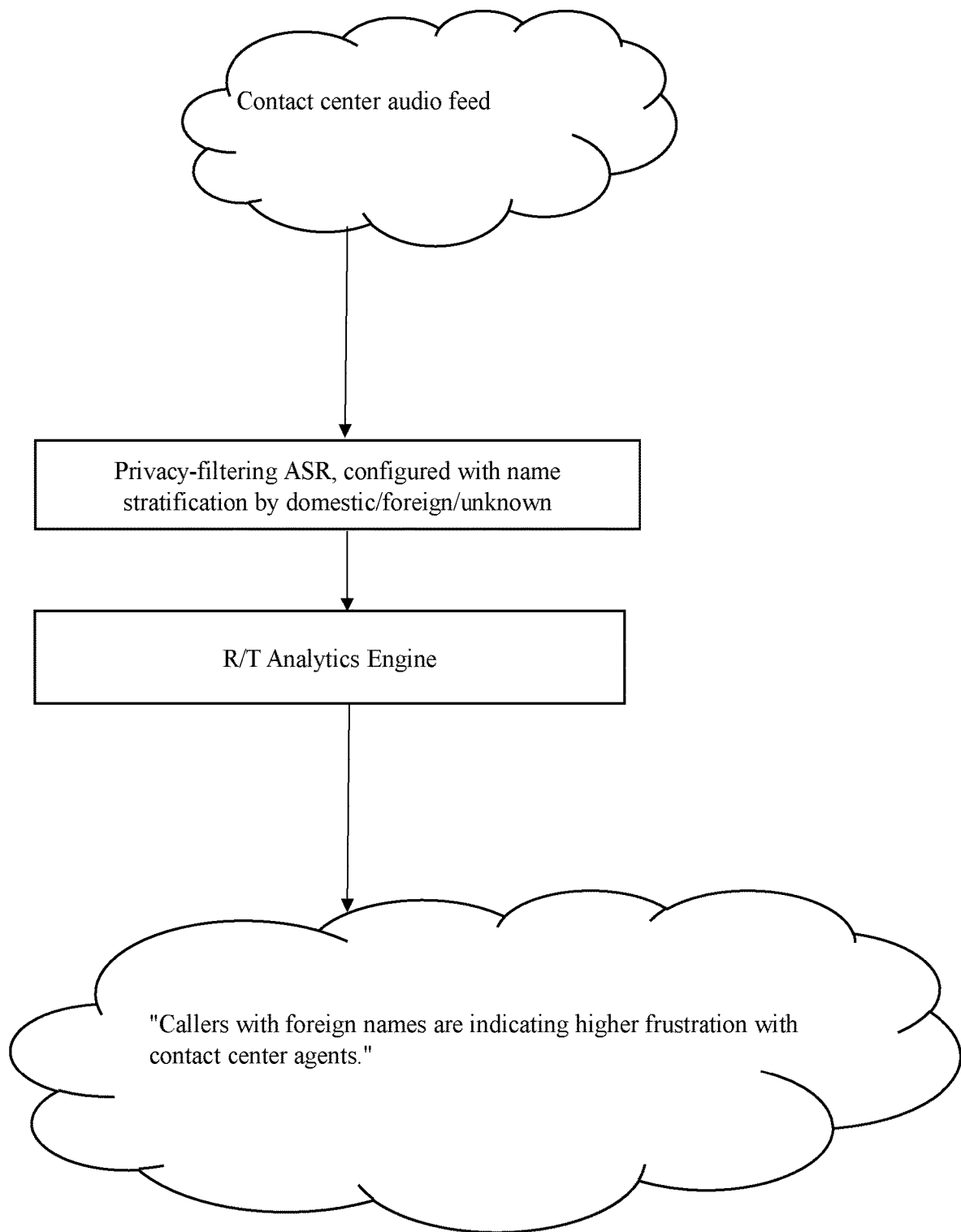
FIG. 9 shows an example of privacy-preserving analytics, based on real-time stratified, tokenized ASR transcriptions, as enabled by some embodiments.

Reference is now made to FIG. 9, which shows an example of privacy-preserving analytics, based on real-time stratified, tokenized ASR transcriptions, as enabled by some embodiments. Certain methods for using stratified, tokenized ASR transcripts to produce privacy-preserving analytics are described in U.S. patent application Ser. No. 16/845,146, entitled "Privacy-by-Design Speech-to-Text Processing and Speech Analytics," filed Apr. 10, 2020 by inventors Garrod and Hines, which application is commonly owned by assignee Medallia, Inc., and previously incorporated by reference herein in its entirety.

Figure 10:
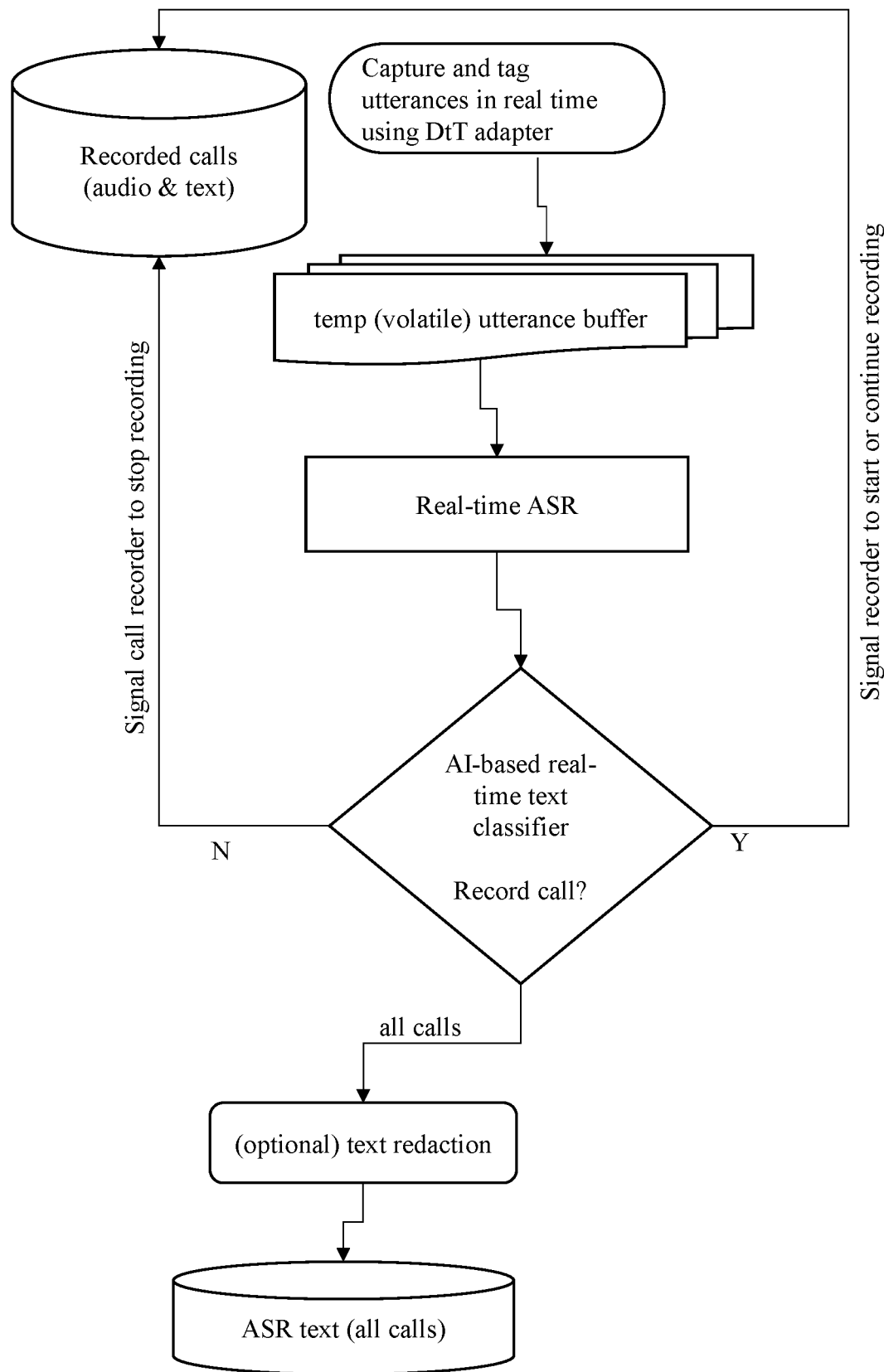
FIG. 10 shows a first (preferred) real-time selective call recording flow for use in connection with certain embodiments; and, FIG. 11 shows a second (alternative) real-time selective call recording flow for use in connection with certain embodiments.
Figure 11:
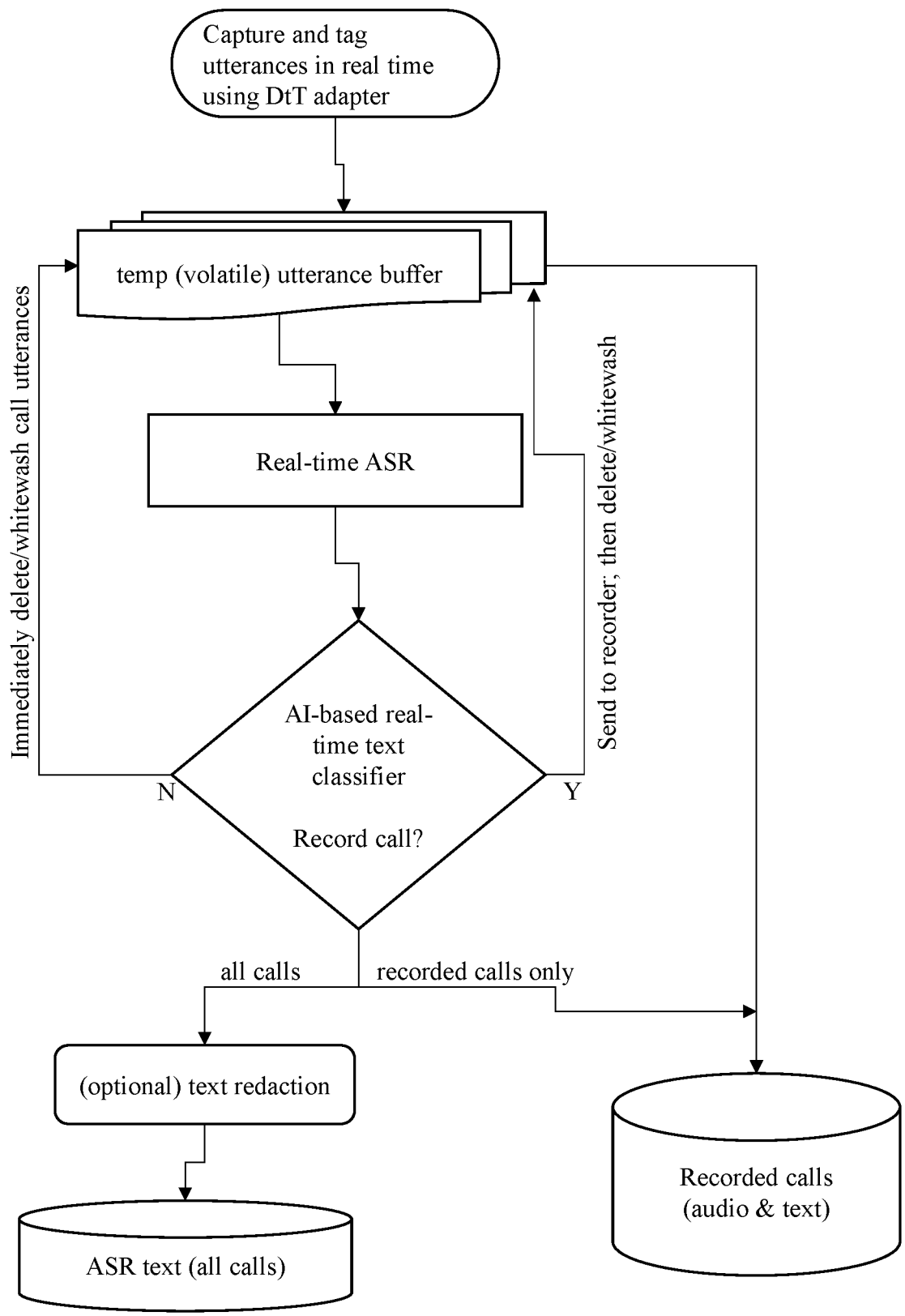

Reference is now made to FIGS. 9 & 10, each of which shows an exemplary real-time selective call recording flow for use in connection with certain embodiments. As shown, each of these flows utilizes an AI-based text classifier to identify, in real time, whether or not a call should be recorded. Appropriate classifiers would include, but are not limited to, deep neural net ("DNN") classifiers and conditional random field ("CRF") classifiers. Such classifiers will typically be trained, using ML techniques, to identify calls that indicate, for example, the presence of: (i) inappropriate agent behavior (e.g., swearing, interruption, off-script, negative tone, etc.); (ii) frustrated or angry customer sentiment; (iii) threats of escalation (e.g., references to supervisor, lawsuit, Better Business Bureau, news media, etc.); and/or (iv) possible customer churn.

What is claimed is:

1. A telephonic contact center monitoring system, comprising:
    a first security zone comprising:
        a direct-to-transcription (DtT) adapter module that receives contact center telephony data indicative of multiple agent-caller communications, said DtT adapter module is configured to separate the received telephony data into tagged utterances, each representing a single utterance spoken by either an agent or a caller; and
        a privacy-filtering automatic speech recognition (ASR) engine configured to process each utterance into a corresponding sanitized ASR transcription; and
    a second security zone comprising:
        a database that receives the tagged utterances that is unredacted, wherein the database is configured to update to include each tagged utterance and wherein the database is further configured to upon termination of a call, delete all utterances associated with the call except for a pending critical follow-up action.

2. The system of claim 1, wherein the second security zone permits access by fewer users than the first security zone.

3. The system of claim 1, wherein the first security zone has fewer security restrictions in comparison to the second security zone.

4. The system of claim 1, wherein the second security zone hosts a critical response team that investigates critical call alert by retrieving, from the database, unredacted utterance(s) associated with the identified critical call.

5. The system of claim 4, wherein the second security zone further includes a speech browser, configured to display the corresponding sanitized ASR transcript(s) and play the corresponding unredacted utterance(s) associated with the identified critical call.

6. The system of claim 1, wherein the DtT adapter module operates without storing contact center telephony data in non-volatile storage locations.

7. The system of claim 1, wherein the privacy-filtering ASR engine is further configured to remove/whitewash audio data that corresponds to the transcribed utterance, subsequent to transcription of an utterance, from any associated computer readable storage device(s).

8. The system of claim 1, wherein the privacy-filtering ASR engine comprises (i) an ASR engine that transcribes utterances and (ii) a post-ASR redaction engine that redacts transcription in accordance with specified redaction criteria.

9. The system of claim 8, wherein the ASR engine is stateless and the post-ASR redaction engine is stateful.

10. The system of claim 1, wherein the privacy-filtering ASR engine comprises a privacy-by-design speech-to-text (STT) engine configured to transcribe non-sensitive information in accordance with an associated privacy-by-design language model.

11. The system of claim 1, further comprising means for selecting class(es) of sensitive information to tokenize, including one or more of:
    (1) personal names or identifying numbers;
    (2) ages;
    (3) locations;
    (4) organizations or entities; and/or
    (5) health conditions, procedures or treatments.

12. The system of claim 11, wherein said means for selecting class(es) of sensitive information to tokenize further comprises means for selecting one or more of the selected class(es) for stratified tokenization.

13. The system of claim 12, wherein the means for selecting comprises one of: (i) a graphical user interface (GUI), (ii) a command line interface, or (iii) an application programing interface (API).

14. The process of claim 8, wherein the steps performed within the first security zone further include:
    providing analytics based on the sanitized ASR transcriptions.

15. A telephonic contact center monitoring system, comprising:
    a first security zone comprising:
        a direct-to-transcription (DtT) adapter module that receives contact center telephony data indicative of multiple agent-caller communications, said DtT adapter module configured to separate the received telephony data into tagged utterances, each representing a single utterance spoken by either an agent or a caller;
an audio database, updated to include each tagged utterance;
a privacy-filtering ASR engine configured to process each utterance into a corresponding unredacted and redacted transcriptions; and
a second security zone comprising a text analytics module, configured to generate real time and post-call analytics from the redacted transcriptions.

16. The system of claim 15 further comprising a natural language processing/machine learning (NLP/ML) classifier module configured to generate an alert based, at least in part, upon one or more of the unredacted ASR transcription(s) that is sanitized and further based on one or more of the tagged utterance(s).

17. The system of claim 15, wherein the privacy-filtering ASR Engine comprises an ASR engine to transcribe each utterance and a post-ASR redaction engine, and wherein the privacy-filtering ASR engine is further configured to redact each transcription in accordance with specified redaction criteria.

18. The system of claim 17, wherein the ASR engine is stateless and wherein the post-ASR redaction engine is stateful.

19. The system of claim 15, further comprising means for selecting class(es) of sensitive information to tokenize, including one or more of:
(1) personal names or identifying numbers;
(2) ages;
(3) locations;
(4) organizations or entities; and/or
(5) health conditions, procedures or treatments.

20. The system of claim 19, wherein said means for selecting class(es) of sensitive information to tokenize further comprises means for selecting one or more of the selected class(es) for stratified tokenization.

\* \* \* \* \*